United States Patent [19]

Mori et al.

[11] 4,308,373

[45] Dec. 29, 1981

[54] HALOGEN-CONTAINING POLYCARBONATE RESIN AND PROCESS FOR PRODUCING SAME

[75] Inventors: Hazime Mori; Katsuhisa Kohyama; Katsuhiko Nakamura; Shigeyuki Haruhata, all of Kitakyushu, Japan

[73] Assignee: Mitsubishi Chemical Industries, Ltd., Tokyo, Japan

[21] Appl. No.: 191,287

[22] Filed: Sep. 26, 1980

[30] Foreign Application Priority Data

Sep. 26, 1979 [JP] Japan .................................. 54/123661

[51] Int. Cl.$^3$ ............................................. C08G 63/62
[52] U.S. Cl. ........................... 528/202; 260/DIG. 24; 525/469; 528/196
[58] Field of Search ................ 528/202; 525/462, 469; 268/DIG. 24

[56] References Cited

U.S. PATENT DOCUMENTS

| | | | |
|---|---|---|---|
| 3,038,879 | 6/1962 | Laakso et al. | 525/469 |
| 3,062,781 | 11/1962 | Bottenbruch et al. | 528/202 |
| 3,119,787 | 1/1964 | Laakso et al. | 260/47 |

FOREIGN PATENT DOCUMENTS 38-7147 of 1963 Japan .

*Primary Examiner*—Theodore E. Pertilla
*Attorney, Agent, or Firm*—Kenway & Jenney

[57] ABSTRACT

A halogen-containing polycarbonate resin is formed by co-polymerizing:

(a) 15 to 55 parts by weight of a polycarbonate oligomer with terminal chloroformate groups, having a number average molecular weight of 500 to 10,000 and containing no aromatic halogen or less than 4% by weight of aromatic halogen, (b) 20 to 80 parts by weight of a halogen-containing polycarbonate oligomer with terminal chloroformate groups, having a number average molecular weight of 1,000 to 10,000 and containing 6 to 30% by weight aromatic halogen, and (c) 5 to 25 parts by weight of bisphenol A.

11 Claims, No Drawings

HALOGEN-CONTAINING POLYCARBONATE RESIN AND PROCESS FOR PRODUCING SAME

BACKGROUND OF THE INVENTION

1. Field of the Invention

The present invention relates to halogen-containing polycarbonate resins which are non-inflammable or inflammable only with difficulty and to an industrially advantageous process for preparing same using phosgene.

2. The Prior Art

Various methods are known for the production of a halogen-containing polycarbonate resin by a phosgene process, for example:

(1) U.S. Pat. No. 3,062,781 discloses a method in which a mixture of a halogenated bisphenol A and bisphenol A is reacted with phosgene to directly yield the resin;

(2) Japanese Patent publication No. 7147, 1963 discloses a method in which bisphenol A is reacted with phosgene to produce a polychloroformate (i.e. a polycarbonate oligomer), which is then reacted with a halogenated bisphenol A and bisphenol A to obtain a resin of high molecular weight; and (3) a method wherein polycarbonate prepared from (1) bisphenol A and (2) a polycarbonate prepared from tetrachlorobisphenol A are catalytically polymerized.

In the production of a polycarbonate resin from bisphenol A by means of the phosgene process, the resin is usually purified by washing the organic solvent solution of the resin, obtained by the polymerization reaction, with an aqueous washing agent such as water or an acid solution. After the washing for purification ("refining"), the organic solvent solution of the resin is concentrated to cause the resin to precipitate from solution in the form of a powder. If an attempt is made to produce a polycarbonate resin containing a relatively large amount of halogen, e.g. the 4% by weight required to render the resin essentially flameproof, using the conventional methods, it is extremely difficult to wash and concentrate the resin/solvent solution obtained by the polymerization and to pulverize the resin using the conventional methods, as compared with the case wherein only bisphenol A is used as the starting material. Moreover, polycarbonate resins of high halogen content obtained by the conventional methods have inferior melt fluidity as compared with a polycarbonate resin prepared from bisphenol A alone.

For example, a methylene chloride solution containing 10% by weight of a polycarbonate resin with a bromine content of 4% by weight, prepared by the above-mentioned method (2), i.e. by the reaction of a polycarbonate oligomer with tetrabromobisphenol A and bisphenol A, forms an emulsion when subjected to washing on an industrial scale, thus hindering the separation of the organic solvent phase containing the resin from the aqueous phase, or, if the separation is possible, numerous dirt layers form which adversely affect the washing efficiency and which make adequate removal of the impurities difficult. Accordingly, the resin product tends to have inferior color and low thermal stability. Further, the resin product is recovered as a viscous gel which is very difficult to pulverize and which inhibits production on an industrial scale.

Accordingly, it is an object of the present invention to provide a flameproof polycarbonate resin having good color, high thermal stability and good melt fluidity.

It is a further object to provide such a polycarbonate resin having a high halogen content.

Yet another object of the invention is to provide an industrially advantageous process for production of such a resin wherein washing, concentrating and pulverizing steps are facilitated.

Other objects and features of the present invention will become apparent from the detailed description to follow.

SUMMARY OF THE INVENTION

As a result of extensive research directed to overcoming the above-mentioned problems in the production of flame-proof polycarbonate resins the present inventors have found that when a polycarbonate oligomer with terminal chloroformate groups, containing little or no aromatic halogen, a polycarbonate oligomer with terminal chloroformate groups and high aromatic halogen content, and bisphenol A, are co-polymerized in certain proportions, the resin is obtained in an organic solvent solution which is readily washed, purified and concentrated. Moreover, the resin product is readily pulverizable and has a good melt fluidity, even though of a high halogen content.

Thus the present invention provides novel polycarbonate resins which have high halogen content yet may be readily comminuted and have good melt viscosity. The present invention also provides for production of a halogen-containing polycarbonate resin by a process suitable for operation on an industrial scale. More specifically, the process of the invention involves:

(a) copolymerizing in the presence of an organic solvent:
  (1) 15 to 55 parts by weight of a polycarbonate oligomer with terminal chloroformate groups, having a number average molecular weight of 500 to 10,000 and containing no aromatic halogen or less than 4% by weight of aromatic halogen,
  (2) 20 to 80 parts by weight of a halogen-containing polycarbonate oligomer with terminal chloroformate groups, having a number average molecular weight of 1,000 to 10,000 and containing 6 to 30% by weight of aromatic halogen, and
  (3) 5 to 25 parts by weight of bisphenol A to form the halogen-containing polycarbonate;

(b) washing the organic solvent solution containing the halogen-containing polycarbonate resin with an aqueous washing agent; and (c) recovering the polycarbonate resin from the organic solvent.

DESCRIPTION OF THE PREFERRED EMBODIMENTS

The polycarbonate oligomer with terminal chloroformate groups, one of the starting materials in the present invention, hereinafter referred to as "oligomer (a)," has a number average molecular weight of 500 to 10,000 and contains no aromatic halogen or less than 4% by weight of aromatic halogen. This "oligomer (a)" may be prepared, for example, by reacting bisphenol A or a mixture of bisphenol A and a halogenated bisphenol A with phosgene by a conventional interfacial polymerization method or solution polymerization method, or by reacting a low molecular weight polycarbonate oligomer prepared from bisphenol A and phosgene, with a halogenated bisphenol A.

Examples of suitable halogenated bisphenol A reactants include 2,2-bis(4-hydroxy-3,5-dibromophenyl) propane (tetrabromo bisphenol A), 2,2-bis(4-hydroxy-3,5-dichlorophenyl) propane, 2,2-bis(4-hydroxy-3-bromophenyl) propane, 2,2-bis(4-hydroxy-3-chlorophenyl) propane, 2,2-bis(4-hydroxy-2,3,5,6-tetrabromophenyl) propane, and 2,2-bis(4-hydroxy-2,3,5,6-tetrachlorophenyl) propane.

A portion of the bisphenol A may be substituted by a dihydroxy diaryl compound, for example, a bis(hydroxyaryl) alkane such as bis(4-hydroxy-phenyl) methane or 1,1-bis(4-hydroxyphenyl) ethane, a bis(hydroxyaryl) cycloalkane such as 1,1-bis(4-hydroxyphenyl) cyclohexane, a dihydroxy-diaryl ether such as 4,4'-dihydroxy diphenyl ether, a dihydroxy diaryl sulfide such as 4,4'-dihydroxy diphenyl sulfide, or a dihydroxy diaryl sulfone such as 4,4'-dihydroxy diphenyl sulfone.

The number average molecular weight of the oligomer (a) is 500 to 10,000, preferably 700 to 5,000. Where the number average molecular weight is too small or too large, the polycarbonate thereby obtained forms an organic solvent solution which is difficult to purify with an aqueous wash or which resists pulverization.

The aromatic halogen content of the oligomer (a) must be less than 4% by weight. The oligomer (a) may contain a small amount of aromatic halogen. However, if the aromatic halogen content is too great no improvement is realized in washability or in concentration and pulverization of the organic solvent solution/suspension of the polycarbonate resin thereby obtained.

The halogen-containing polycarbonate oligomer with terminal chloroformate groups, having a number average molecular weight of 1,000 to 10,000 and containing 6 to 30% by weight of aromatic halogen (hereinafter referred to as "oligomer (b)") can be produced by reacting a mixture of the halogenated bisphenol A and bisphenol A with phosgene by conventional interfacial polymerization or solution polymerization, or by reacting a polycarbonate oligomer prepared from bisphenol A and phosgene, e.g. oligomer (a), with the halogenated bisphenol A. In the production of the oligomer (b), a part of the bisphenol A may be substituted with a dihydroxy aryl compound as is the method for the production of oligomer (a).

The aromatic halogen content of the oligomer (b) is 6 to 30% by weight, preferably 8 to 20% by weight. If the aromatic halogen content is too small, it is impossible to obtain a high halogen content in the polycarbonate resin thereby obtained and accordingly it is impossible to obtain a polycarbonate resin which is sufficiently flameproof. On the other hand, if the aromatic halogen content is too great, washing and pulverization of the organic solvent solution/suspension of the polycarbonate resin thereby obtained, becomes difficult.

The number average molecular weight of the oligomer (b) is 1,000 to 10,000, preferably 1,500 to 7,000. If the number average molecular weight is either too small or too large, the washing and pulverization of the organic solvent solution/suspension of the polycarbonate resin becomes difficult.

The bisphenol A starting material may be partially substituted by a dihydroxy diaryl compound other than bisphenol A, for example one of those mentioned above, or by a halogenated bisphenol A.

The co-polymerization reaction of the present invention can be carried out by subjecting the three starting materials i.e. oligomer (a), oligomer (b) and bisphenol A to interfacial polymerization or solution polymerization in the presence of an acid binding agent, a terminator and an organic solvent in accordance with conventional techniques.

Oligomers (a) and (b) may be used as individually isolated products. However, in industrial applications of the copolymerization reaction of the present invention it may be advantageous to use them in the form of a mixture obtained from the production of the oligomers, without isolation, or after removing water from such a mixture as the case requires.

The ratio of the three starting materials is determined on the basis of the aromatic halogen contents of oligomers (a) and (b) and the desired halogen content for the polycarbonate resin product, and is within a range, based on a total of 100 parts by weight, wherein oligomer (a) is 15 to 55 parts by weight, preferably 25 to 50 parts by weight, oligomer (b) is 20 to 80 parts by weight, preferably 30 to 65 parts by weight and bisphenol A is 5 to 25 parts by weight, preferably 10 to 20 parts by weight.

The temperature and pressure for the co-polymerization may be similar to those used in known methods for the production of polycarbonate resins, namely, at room temperature and in the vicinity of atmospheric pressure. The reaction time is 0.5 to 5 hours, preferably 1 to 3 hours.

The organic solvent solution of the polycarbonate resin thus obtained by the present co-polymerization reaction, is readily washable with an aqueous washing agent, i.e. no stable emulsion forms, and the impurities are readily extracted into the aqueous phase. This resistance to formation of an emulsion and ease of impurity extraction are collectively referred to herein as "good washability." Moreover, in the present invention the resin is readily separated from the organic solvent solution by concentrating the solution in a conventional manner, e.g. by evaporation, and the resin thereby obtained is easily pulverized (comminuted) to a desirable particle size even though it has a high halogen content. Accordingly, it is possible to produce a highly pure halogen-containing polycarbonate resin by a process suitable for industrial use. Moreover, the resin thus obtained has a good melt fluidity. Thus, the process of the present invention shows a distinct advantage over conventional methods in enabling production of a halogen-containing polycarbonate resin having a halogen content of 6 to 24% by weight and a reduced viscosity of 0.3 to 1.0.

Although the mechanism or mechanisms by which the method of the present invention provides the aforementioned advantages, i.e. good washability, ease of recovery and pulverization of the resin, and the good melt fluidity of the resin, are not entirely clear at the present time, it is believed that by the copolymerization of the present invention, units of oligomers (a) and (b) each having a certain length are arranged with a certain regularity to form a block co-polymer.

Now, the invention will be described in further detail by the working examples which follow. It should be understood, however, that the present invention is not limited to these specific examples. In the following examples, "parts" and "%" mean "parts by weight" and "% by weight," respectively. "Number average molecular weight" as used herein is calculated by the following formula:

$$\left( \begin{array}{c} \text{terminal chloroformate groups} + \\ \text{terminal hydroxyl groups } \mu eq/g \end{array} \right) \times \frac{10^6}{2}$$

and "reduced viscosity ($\eta sp/C$)" represents a value obtained by measuring a 0.6 g/dl methylene chloride solution at 20° C. with use of Ubbelohde's viscometer; the numbers for terminal chloroformate groups reported here were calculated from the analysis of chlorine produced by the decomposition of the oligomers; the numbers for terminal hydroxyl groups represent values obtained from the colorimetric analysis of the color development of titanium tetrachloride; the numbers for bromine content represent values measured by fluorescent X-ray; the values for water content were determined by Karl Fisher's method; and the values for remainder of bisphenol A were measured by an ultraviolet absorption analysis.

EXAMPLE 1

An aqueous alkali solution containing 13.5% bisphenol A was prepared by dissolving bisphenol A in a 5.5% sodium hydroxide aqueous solution (hereinafter referred to as "BPA solution"). This BPA solution, with methylene chloride added, was reacted with phosgene to obtain a methylene chloride solution containing 23.3% of oligomer (a) having a number average molecular weight of 800 and containing terminal chloroformate groups 2320 $\mu eq/g$ oligomer and terminal hydroxyl groups 95 $\mu eq/g$ oligomer.

An aqueous alkali solution containing 27% tetrabromobisphenol A (hereinafter referred to as "TBBPA solution") was prepared by dissolving tetrabromobisphenol A in a 5.5% sodium hydroxide aqueous solution. 126 parts of this TBBPA solution were added to 430 parts of the above methylene chloride solution of oligomer (a). The ensuing reaction resulted in formation of a methylene chloride solution containing 28.2% of oligomer (b) having a number average molecular weight of 1600, a bromine content of 15.2%, terminal chloroformate groups 1170 $\mu eq/g$ oligomer, and terminal hydroxyl groups 70 $\mu eq/g$ oligomer.

258 parts of the above-mentioned methylene chloride solution of oligomer (a), 250 parts of the methylene chloride solution of the oligomer (b), 200 parts of the BPA aqueous alkali solution, 250 parts of methylene chloride, 2.8 parts of p-tertiary butyl phenol and 0.06 part of triethylamine, were fed into a tank equipped with an agitator and the co-polymerization reaction was conducted for 1.5 hours with agitation.

After the completion of the co-polymerization reaction methylene chloride was added to the reaction mixture to dilute it so that the polycarbonate resin concentration relative to the methylene chloride was reduced to 10%. After mixing and agitating the mixture in the agitation tank, the mixture was left to stand still for phase separation and then the methylene chloride phase was separated and washed 5 times under the conditions indicated in the following Table 1. Upon completion of each step, the water content of the methylene chloride solution was measured.

TABLE 1

| Steps | Agitation & Mixing Washing agent | Water phase ratio | Time (min) | Standing Time for Separation Time (min) | State of Separation | Water Content of Methylene Chloride Solution (%) |
|---|---|---|---|---|---|---|
| 1 | Water | 0.3:1.0 | 10 | 10 | good | 0.71 |
| 2 | Water | 0.3:1.0 | 20 | 10 | good | 0.45 |
| 3 | 0.1 N HCl | 0.3:1.0 | 20 | 10 | good | 0.28 |
| 4 | Water | 0.3:1.0 | 20 | 10 | good | 0.23 |
| 5 | Water | 0.3:1.0 | 20 | 10 | good | 0.25 |

In the above Table, the "water phase ratio" is the ratio of the weight of the water phase to the weight of the methylene chloride phase.

The methylene chloride solution of the halogen-containing polycarbonate resin thus obtained after the washing operation, was introduced to a jacketed, double armed, horizontal type mixer having a capacity of 15 liters, for pulverization and concentration.

Into the above mixer, 1 kg of a separately prepared halogen-containing polycarbonate resin was preliminarily fed, and hot water at a temperature of 80° C. was circulated through the jacket for heating. While stirring, the above-mentioned methylene chloride solution of the halogen-containing polycarbonate resin was introduced at a rate of 30 kg/hr. The pulverization was achieved while evaporating the methylene chloride.

The halogen-containing polycarbonate resin thus obtained had a bulk density of 0.76 g/ml, spherical particle sizes of 1 to 3 mm, a reduced viscosity of 0.49 $\eta sp/C$, a bromine content of 8.1% and a bisphenol A remainder of 320 ppm and exhibited a good processability when passed through an extruder.

With use of pellets of this resin, test samples were molded with an injection molding machine. Good test samples were obtained at a molding temperature of 310° C. under an injection pressure of 57 kg/cm$^2$.

COMPARATIVE EXAMPLE 1

258 parts of the methylene chloride solution of the oligomer (a) of Example 1, 4.04 parts of TBBPA alkali solution, 87.4 parts of the BPA aqueous alkali solution, 250 parts of methylene chloride, 1.7 parts of p-tertiary butyl phenol and 0.06 parts of triethylamine, were fed into an agitation tank and reacted for 30 minutes under agitation. After addition of 17.4 parts of BPA aqueous alkali solution the tank contents were agitated for one additional hour to complete the co-polymerization reaction.

After the completion of the co-polymerization reaction, the methylene chloride phase was washed in the same manner as in Example 1. The results were as shown in Table 2.

TABLE 2

| Steps | Agitation Mixing Water phase ratio | Time (min.) | Standing Time for Separation Time (min.) | State of Separation | Water content of the methylene chloride solution (%) |
|---|---|---|---|---|---|
| 1 | 0.3:1 | 10 | 30 | Interfacial separation was unclear after 10 minutes | 7.8 |
| 2 | 0.3:1 | 20 | 10 | | 5.6 |

TABLE 2-continued

| Steps | Agitation Mixing | | Standing Time for Separation | | Water content of the methylene chloride solution (%) |
|---|---|---|---|---|---|
| | Water phase ratio | Time (min.) | Time (min.) | State of Separation | |
| 3 | 0.3:1 | 20 | 10 | separation occurs but a dirt layer forms at the interface | 2.2 |
| 4 | 0.3:1 | 20 | 10 | | 0.62 |
| 5 | 0.3:1 | 20 | 10 | | 0.31 |

The methylene chloride solution of the halogen-containing polycarbonate resin thus obtained after the washing operation, was subjected to pulverization with concentration in the same manner as in Example 1. However, at a feed rate of 30 kg/hr, the resin could not be formed into a powder. Rather, the resin congealed into large blocks, and finally the operation had to be stopped. It was possible to operate with a feed rate of 15 kg/hr. However, the particles were irregular, having particle sizes of 3 to 10 mm and a bulk density of 0.50 g/ml, and the processability by extruder was poor. Further, the resin product had a low viscosity, i.e. 0.48 $\eta sp/C$, a bromine content of 7.8%, and a bisphenol A remainder of 4,200 ppm.

Using this resin, test samples were molded by an injection molding machine. In order to obtain satisfactory test samples, a molding temperature of 310° C. and an injection pressure or 71 kg/cm² were required.

EXAMPLE 2

In the presence of methylene chloride, BPA aqueous alkali solution and phosgene were reacted to obtain a methylene chloride solution containing 27.0% of oligomer (a) having a number average molecular weight of 700, terminal chloroformate groups 2850 $\mu eq/g$ oligomer, and terminal hydroxyl groups 160 $\mu eq/g$ oligomer.

Separately, in the presence of methylene chloride, BPA aqueous alkali solution, TBBPA aqueous alkali solution and phosgene were reacted to obtain a methylene chloride solution containing 26.5% of oligomer (b) having a number average molecular weight of 1070, a bromine content of 12.5%, terminal chloroformate groups 1790 $\mu eq/g$ oligomer and terminal hydroxyl groups 85 $\mu eq/g$ oligomer.

148 parts of the above-mentioned solution of oligomer (a), 226 parts of the solution of oligomer (b), 200 parts of BPA aqueous alkali solution, 200 parts of methylene chloride, 1.6 parts of p-tertiary butyl phenol and 0.03 parts of triethylamine, were fed into an agitation tank, and the co-polymerization reaction was conducted for 1.5 hours under agitation.

After the completion of the co-polymerization reaction, the reaction mixture was washed in the same manner as in Example 1. Upon completion of the first, third, and fifth washing steps, the water content of the methylene chloride solution was measured and found to be 0.86%, 0.28% and 0.21%, respectively.

The halogen-containing polycarbonate resin obtained by evaporating methylene chloride from the methylene chloride solution after the completion of the washing operation, had a reduced viscosity of 0.60 $\eta sp/C$, a bromine content of 7.5% and a bisphenol A remainder of 545 ppm.

EXAMPLE 3

In the presence of methylene chloride, BPA aqueous alkali solution and phosgene were reacted to obtain a methylene chloride solution containing 28.2% of oligomer (a) having a number average molecular weight of 1460, and terminal chloroformate groups 1270 $\mu eq/g$ oligomer.

To 355 parts of this methylene chloride solution of oligomer (a), 50 parts of TBBPA aqueous alkali solution were added and reacted to obtain a methylene chloride solution containing 30.2% of oligomer (b) having a number average molecular weight of 6250, a bromine content of 12.2%, terminal chloroformate groups of 290 $\mu eq/g$ oligomer, and terminal hydroxyl groups of 30 $\mu eq/g$ oligomer.

106 parts of the solution of oligomer (a), 212 parts of the solution of the oligomer (b), 74 parts of BPA aqueous alkali solution, 220 parts of methylene chloride, 1.9 parts of p-tertiary butyl phenol and 0.04 parts of triethylamine, were fed into an agitation tank and the co-polymerization reaction was carried out for 1.5 hours under agitation.

After the completion of the co-polymerization reaction, the reaction mixture was washed in the same manner as in Example 1. Upon the completion of the first, third and fifth washing steps, the water content of the methylene chloride was determined to be 0.81%, 0.29% and 0.20%, respectively.

The halogen-containing polycarbonate resin obtained by evaporating methylene chloride from the methylene chloride solution, after the completion of the washing operation, had a reduced viscosity of 0.51 $\eta sp/C$, a bromine content of 7.9% and a bisphenol A remainder of 410 ppm.

EXAMPLE 4

In the presence of methylene chloride, BPA aqueous alkali solution, TBBPA aqueous alkali solution and phosgene, were reacted to obtain a methylene chloride solution containing 25.6% of oligomer (a) having a number average molecular weight of 840, a halogen content of 2.0%, terminal chloroformate groups 2190 $\mu eq/g$ oligomer, and terminal hydroxyl groups 190 $\mu eq/g$ oligomer.

Using a greater amount of TBBPA, the above method was repeated, whereby a methylene chloride solution containing 27.2% of oligomer (b) having a number average molecular weight of 5190, a halogen content of 17.2%, terminal chloroformate groups 360 $\mu eq/g$ oligomer and terminal hydroxyl groups 25 $\mu eq/g$ oligomer was obtained.

195 parts of the solution of oligomer (a), 185 parts of the solution of oligomer (b), 120 parts of BPA aqueous alkali solution, 170 parts of methylene chloride, 1.8 parts of p-tertiary butyl phenol and 0.04 parts of triethylamine, were fed into an agitation tank, and the co-polymerization reaction was conducted for 1.5 hours under agitation.

After the completion of the co-polymerization reaction, the reaction mixture was washed in the same manner as in Example 1. Upon the completion of the first, third and fifth washing steps, the water content of the methylene chloride solution was determined to be 1.21%, 0.30%, and 0.22%, respectively.

The halogen-containing polycarbonate resin thus obtained by evaporating the methylene chloride after the completion of the washing, had a reduced viscosity of 0.56 ηsp/C, a bromine content of 9.3% and bisphenol A remainder of 650 ppm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A halogen-containing polycarbonate resin formed by copolyerizing in the presence of an organic solvent:
   (a) 15 to 55 parts by weight of a polycarbonate oligomer with terminal chloroformate groups, having a number average molecular weight of 500 to 10,000, containing no aromatic halogen or less than 4% by weight of aromatic halogen and containing recurring units derived from bisphenol A and phosgene,
   (b) 20 to 80 parts by weight of a halogen-containing polycarbonate oligomer with terminal chloroformate groups, having a number average molecular weight of 1,000 to 10,000, containing 6 to 30% by weight of aromatic halogen and containing recurring units derived from bisphenol A, halogenated bisphenol A and phosgene, and
   (c) 5 to 25 parts by weight of bisphenol A.

2. A polycarbonate resin in accordance with claim 1 containing 6 to 24% by weight halogen.

3. A process for forming a halogen-containing polycarbonate resin comprising:
   (a) copolymerizing in the presence of an organic solvent to form a solution of the halogen-containing polycarbonate in the organic solvent:
      (1) 15 to 55 parts by weight of a polycarbonate oligomer with terminal chloroformate groups, having a number average molecular weight of 500 to 10,000, containing no aromatic halogen or less than 4% by weight of aromatic halogen and containing recurring units derived from bisphenol A and phosgene,
      (2) 20 to 80 parts by weight of a halogen containing polycarbonate oligomer with terminal chloroformate groups, having a number average molecular weight of 1,000 to 10,000, containing 6 to 30% by weight of aromatic halogen and containing recurring units derived from bisphenol A, halogenated bisphenol A and phosgene, and
      (3) 5 to 25 parts by weight of bisphenol A;
   (b) washing said solution with an aqueous washing agent; and
   (c) recovering the polycarbonate resin from the organic solvent.

4. The process of claim 3 wherein said organic solvent is methylene chloride.

5. A process in accordance with claim 4 wherein the viscosity of a methylene chloride solution containing 0.6 g/dl of the halogen-containing polycarbonate resin is 0.3 to 1.0 as measured at 20° C.

6. The process of claim 3 wherein the halogen-containing polycarbonate resin is recovered from the organic solvent by evaporating the organic solvent to concentrate the solution and thereby cause the halogen-containing polycarbonate resin to separate from solution.

7. The process of claim 6 wherein the halogen-containing resin is simultaneously comminuted as it separates from solution.

8. The product of claim 1 wherein oligomer (b) is formed by (1) reacting phosgene with a mixture of bisphenol A and a halogenated bisphenol A or (2) reacting phosgene with bisphenol A alone to form an oligomer reaction product and then reacting said oligomer reaction product with a halogenated bisphenol A.

9. The process of claim 3 wherein said oligomer containing 6–30% by weight of aromatic halogen is formed by (1) reacting phosgene with a mixture of bisphenol A and a halogenated bisphenol or (2) reacting phosgene with bisphenol A alone to form an oligomer reaction product and then reacting said oligomer reaction product with a halogenated bisphenol A.

10. The product of claim 1 or 8 wherein oligomer (b) is formed by reacting oligomer (a) with a halogenated bisphenol A.

11. The process of claim 3 or 9 wherein said oligomer containing 6 to 30% by weight of aromatic halogen is formed by reacting an oligomer containing no aromatic halogen or less than 4% by weight of aromatic halogen with a halogenated bisphenol A.

* * * * *